(12) United States Patent
Peng et al.

(10) Patent No.: US 11,017,254 B2
(45) Date of Patent: May 25, 2021

(54) IMAGE DATA RETRIEVING METHOD AND IMAGE DATA RETRIEVING DEVICE

(71) Applicant: Wistron Corporation, New Taipei (TW)

(72) Inventors: Ying-Hao Peng, New Taipei (TW); Zih-Yang Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 185 days.

(21) Appl. No.: 15/955,695

(22) Filed: Apr. 18, 2018

(65) Prior Publication Data
US 2019/0228252 A1  Jul. 25, 2019

(30) Foreign Application Priority Data
Jan. 24, 2018 (TW) ................. 107102433

(51) Int. Cl.
*G06K 9/32* (2006.01)
*G06F 3/048* (2013.01)
(Continued)

(52) U.S. Cl.
CPC .......... *G06K 9/3233* (2013.01); *G06F 3/048* (2013.01); *G06K 9/00449* (2013.01); *G06T 7/11* (2017.01);
(Continued)

(58) Field of Classification Search
CPC .......... G06K 2209/01; G06K 9/00463; G06K 9/346; G06K 9/00456; G06K 9/00442;
(Continued)

(56) References Cited

U.S. PATENT DOCUMENTS 5,680,478 A   10/1997   Wang et al.
5,680,479 A   10/1997   Wang et al.
(Continued)

FOREIGN PATENT DOCUMENTS

EP      0567344        10/1993
KR    20130066819      6/2013
(Continued)

OTHER PUBLICATIONS

"Search Report of Europe Counterpart Application", dated Dec. 11, 2018, p. 1-p. 8.
(Continued)

*Primary Examiner* — Ross Varndell
(74) *Attorney, Agent, or Firm* — JCIPRNET

(57) ABSTRACT

An image data retrieving method and an image data retrieving device are provided. The image data retrieving method includes: receiving an image including a plurality of data from a communication interface; obtaining a plurality of regions of interest from the image, wherein each of the regions of interest is a data image including at least one of the data; dividing the regions of interest into a plurality of groups, wherein at least one of the data included in the regions of interest of each of the groups has a same type; combining the regions of interest of each of the groups into a to-be-recognized image; and performing an optical character recognition to the to-be-recognized image corresponding to each of the groups respectively to obtain the data corresponding to the regions of interest of each of the groups.

17 Claims, 7 Drawing Sheets

(51) Int. Cl.
*G06T 7/11* (2017.01)
*G06K 9/00* (2006.01)

(52) U.S. Cl.
CPC ..... *G06K 2209/01* (2013.01); *G06K 2209/03* (2013.01)

(58) Field of Classification Search
CPC .......... G06K 9/18; G06K 9/38; G06K 9/6202; G06K 2209/03; G06K 9/342; G06K 9/344; G06K 9/4604; G06K 9/4652; G06T 7/11
See application file for complete search history.

(56) References Cited

U.S. PATENT DOCUMENTS

| | | | |
|---|---|---|---|
| 6,081,616 A | 6/2000 | Vaezi et al. | |
| 6,115,497 A | 9/2000 | Vaezi et al. | |
| 9,082,039 B2 | 7/2015 | Kim et al. | |
| 9,235,779 B2 | 1/2016 | Kim et al. | |
| 9,883,035 B1 | 1/2018 | Kulkarni et al. | |
| 2001/0054106 A1* | 12/2001 | Anderson | H04L 67/306 709/227 |
| 2008/0002893 A1* | 1/2008 | Vincent | G06K 9/3258 382/229 |
| 2013/0148899 A1 | 6/2013 | Kim et al. | |
| 2014/0185863 A1* | 7/2014 | Makkonen | G06K 9/3233 382/101 |
| 2015/0278630 A1 | 10/2015 | Kim et al. | |
| 2017/0024633 A1 | 1/2017 | Negro et al. | |
| 2017/0351913 A1 | 12/2017 | Chen et al. | |
| 2018/0011974 A1 | 1/2018 | Schneider et al. | |

FOREIGN PATENT DOCUMENTS

| | | |
|---|---|---|
| KR | 101809490 | 12/2017 |
| TW | I419015 | 12/2013 |
| WO | 2008127443 | 10/2008 |
| WO | 2013026868 | 2/2013 |
| WO | 2017015404 | 1/2017 |

OTHER PUBLICATIONS

"Office Action of Taiwan Counterpart Application", dated Oct. 19, 2018, p. 1-p. 9.
"Office Action of Korea Counterpart Application," dated Jul. 29, 2019, p. 1-p. 8.
"Office Action of India Counterpart Application", dated Oct. 20, 2020, p. 1-p. 5.
"Office Action of China Counterpart Application", dated Oct. 30, 2020, p. 1-p. 11.

* cited by examiner

| Fonts A: | Fonts B: | Integer: | Data 1: |
|---|---|---|---|
| 45 | 7.0 | 20787 | 12.6 |
| 45 | 7.0 | 277 | |
| 44 | 120 | 1020 | Data 2: |
| 45 | 120 | | 11 |
| 45 | 2.0 | Float: | |
| 220 | 2.0 | | Data 3: |
| 235 | 12 | −6.5 | 29 |
| 260 | 0 | −6.5 | |
| 230 | 0 | | Data 4: |
| 190 | 0 | | −6.5 |
| 175 | 0.340 | String: | |
| 175 | 0.344 | | Data 5: |
| 175 | 0.484 | 15277TN1−LF | 15277TN1−LF |
| 180 | 0.440 | | |
| 180 | −8 | FIG. 3C | FIG. 3D |
| 160 | −18 | | |
| 150 | −1.000 | | |

FIG. 3A   FIG. 3B

IMAGE DATA RETRIEVING METHOD AND IMAGE DATA RETRIEVING DEVICE

CROSS-REFERENCE TO RELATED APPLICATION

This application claims the priority benefit of Taiwan application serial no. 107102433, filed on Jan. 24, 2018. The entirety of the above-mentioned patent application is hereby incorporated by reference herein and made a part of this specification.

BACKGROUND OF THE INVENTION

1. Field of the Invention

The invention relates to an image data retrieving method and an image data retrieving device. More particularly, the invention relates to an image data retrieving method and an image data retrieving device capable of accelerating an image data recognition speed.

2. Description of Related Art

The optical character recognition (OCR) technology is a technology used most of the time to recognize a character in an image. When a great quantity of word data or number data is contained in the image and the formats (e.g., fonts, colors, sizes) of the data are different, a longer processing time is required in order to recognize the data in the image. Therefore, how to accelerate the recognition speed and enhance the recognition accuracy with limited time and hardware resources is an important goal for those skilled in the art.

SUMMARY OF THE INVENTION

The invention provides an image data retrieving method and an image data retrieving device capable of accelerating a recognition speed and enhancing a recognition accuracy when performing an optical character recognition to an image with limited time and hardware resources.

The invention provides an image data retrieving method including following steps. An image including a plurality of data is received from a communication interface. A plurality of regions of interest are obtained from the image, wherein each of the regions of interest is a data image including at least one of the data. The regions of interest are divided into a plurality of groups, wherein at least one of the data included in the regions of interest of each of the groups has a same type. The regions of interest of each of the groups are combined into a to-be-recognized image. An optical character recognition is performed to the to-be-recognized image corresponding to each of the groups respectively to obtain the data corresponding to the regions of interest of each of the groups.

The invention further provides an image data retrieving device including a processor, a communication interface coupled to the processor, and a memory coupled to the processor and configured for storing a computer program. The processor is configured for executing the computer program to perform following steps. An image including a plurality of data is received from the communication interface. A plurality of regions of interest are obtained from the image, wherein each of the regions of interest is a data image including at least one of the data. The regions of interest are divided into a plurality of groups, wherein at least one of the data included in the regions of interest of each of the groups has a same type. The regions of interest of each of the groups are combined into a to-be-recognized image. An optical character recognition is performed to the to-be-recognized image corresponding to each of the groups respectively to obtain the data corresponding to the regions of interest of each of the groups.

To sum up, in the image data retrieving method and the image data retrieving device provided by the embodiments of the invention, the regions of interest in an image are divided into groups. The regions of interest in each of the groups are vertically arranged, and the optical character recognition is then performed to each of the groups, so as to accelerate the recognition speed and enhance the recognition accuracy. When the image is received through the display of the machine, the configuration file corresponding to the regions of interest and the groups may be saved after all the results of the optical character recognition are correct. In this way, when receiving another subsequent image on the same machine, the optical character recognition may be directly performed based on the configuration file, and that the recognition speed is accelerated.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A to FIG. 3D are examples of establishing groups for regions of interest according to an embodiment of the invention.

DESCRIPTION OF THE EMBODIMENTS

Figure 1:
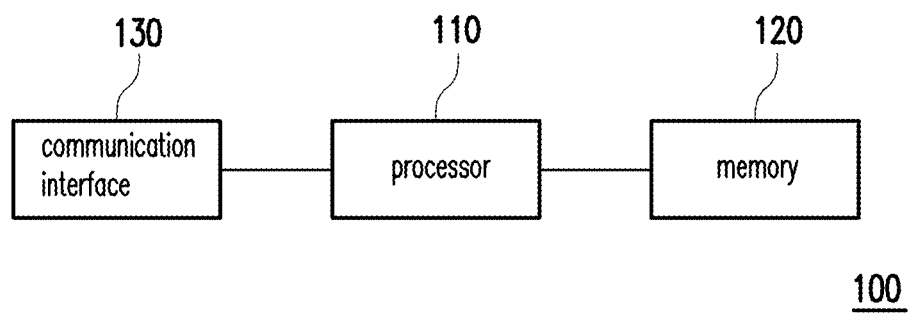
FIG. 1 is a block diagram of an image data retrieving device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of an image data retrieving device according to an embodiment of the invention.

With reference to FIG. 1, an image data retrieving device 100 provided by an embodiment of the invention includes a processor 110, a memory 120, and a communication interface 130. The memory 120 and the communication interface 130 are coupled to the processor 110. The image data retrieving device 100 may be a personal computer, a server, a tablet computer, a Smartphone, or any other electronic device. The image data retrieving device 100 may receive an image through the communication interface 130. Data images of a plurality of regions of interest (ROI) in the image are retrieved by the processor 110, and corresponding data is further recognized.

In an embodiment, the processor 110 may be a central processing unit (CPU) or other programmable microprocessor for general or special use, a digital signal processor (DSP), a programmable controller, application specific integrated circuit (ASIC), any other similar device, or a combination of the foregoing devices.

In an embodiment, the memory 120 may be a fixed or a movable random access memory (RAM) in any form, a read-only memory (ROM), a flash memory, a hard disk drive (HDD), a solid state drive (SSD), any other similar device, or a combination of the foregoing devices. The memory 120 may be configured to store the data, a configuration file, the image, or a computer program described in the embodiments of the invention to be processed or executed by the processor.

In an embodiment, the communication interface 130 may be a wireless communication interface supporting signal transmission of a system such as the global system for mobile communication (GSM), the personal handy-phone system (PHS), the code division multiple access (CDMA) system, the wideband code division multiple access (WCDMA) system, the long term evolution (LTE) system, the worldwide interoperability for microwave access (WiMAX) system, the wireless fidelity (Wi-Fi) system, or the Bluetooth. In another embodiment, the communication interface 130 may also be a wired communication interface capable of transmitting or receiving image data, such as the universal serial bus (USB) interface, the inter-Integrated bus (I2C bus), or any other wired communication interface. The invention does not limit the types of the communication interface 130.

Figure 2:
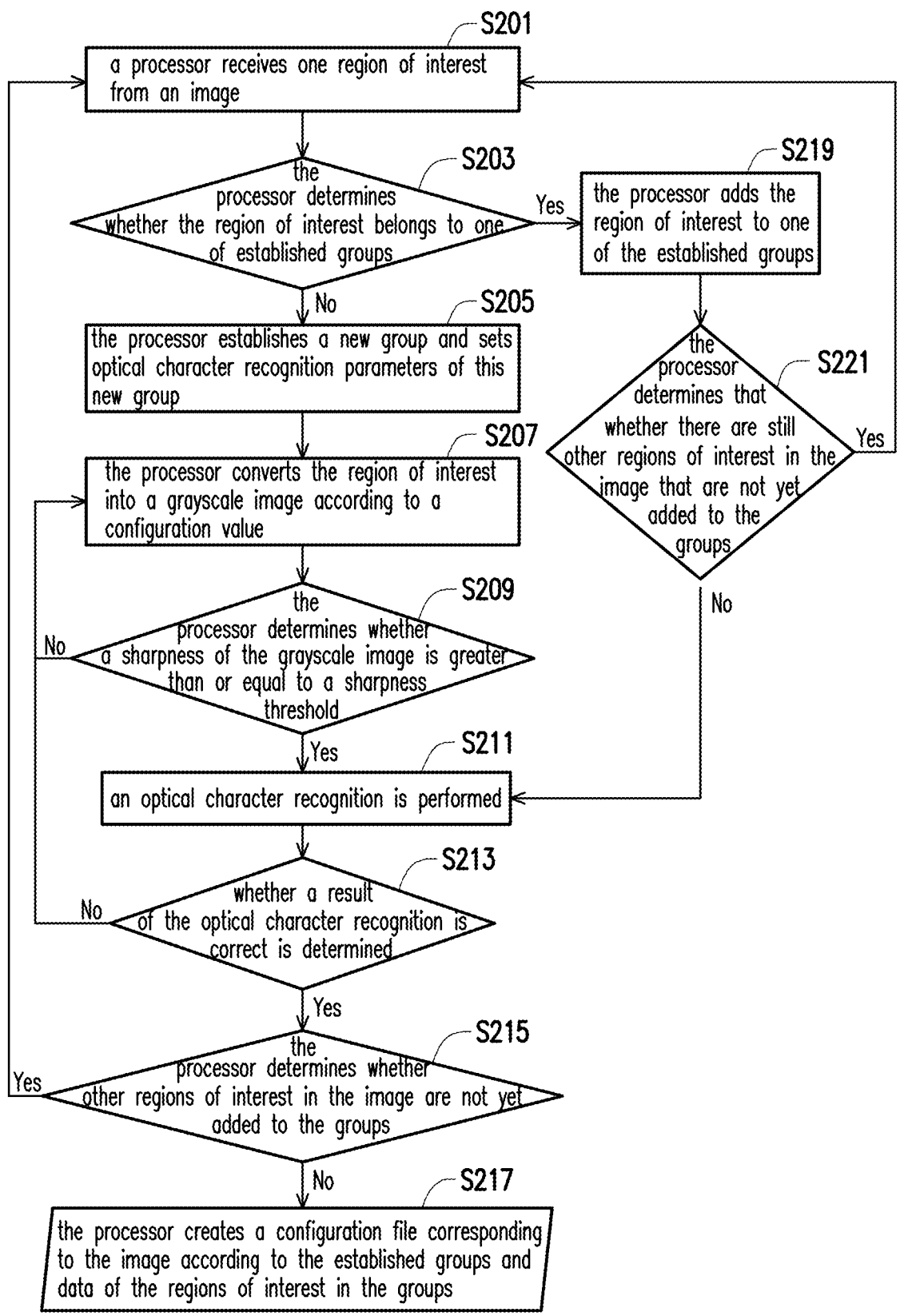
FIG. 2 is a flow chart of an image data retrieving method according to an embodiment of the invention.

FIG. 2 is a flow chart of an image data retrieving method according to an embodiment of the invention. The method may be implemented by a computer program stored in the memory 120 and is executed by the processor 110.

In step S201, the processor 110 obtains one region of interest from the image. To be specific, the processor 110 receives an image first, selects one region of interest from the image, and then obtains parameters such as an identification (ID), coordinates, a data type, etc. of this region of interest. In this embodiment, identifications of the regions of interest may be different. When the region of interest is a rectangular region, the coordinates of the region of interest may be presented through an X coordinate range and a Y coordinate range of the rectangular region. A data image type of the region of interest may include a string, an integer, a floating-point number, a font, a color, a typeface size, etc.

In step S203, the processor 110 determines whether the region of interest belongs to one of established groups. If the region of interest does not belong to one of the established groups, the processor 110 establishes a new group and sets optical character recognition parameters of this new group in step S205. The optical character recognition parameters may include a group identification, a group language, a binary threshold value, an image zoom ratio, whether to be all numbers, a font training file corresponding to a specific font, and the like.

The processor 110 converts the region of interest into a binary image according to a configuration value in step S207. To be specific, the processor 110 may convert the region of interest into the binary image through a grayscale mode or a mask mode. In the grayscale mode, the configuration value may include a threshold ranging from 0 to 255, a threshold boundary, a zoom ratio (e.g., 1 to 4), and other parameters. In the mask mode, the configuration value may include a mask RGB value ranging from (0,0,0) to (255, 255,255), a mask RGB boundary, the zoom ratio (e.g., 1 to 4), and other parameters.

In step S209, the processor 110 determines whether a sharpness of the binary image is greater than or equal to a sharpness threshold. If the sharpness of the binary image is less than the sharpness threshold, step S207 is performed again to adjust the configuration value, and the region of interest is converted into the binary image according to the adjusted configuration value. If the sharpness of the binary image is greater than or equal to the sharpness threshold, the optical character recognition is performed in step S211. That is, the optical character recognition is performed to the binary image to retrieve a character or a number in the binary image.

The processor 110 determines whether a result of the optical character recognition is correct in step S213. To be specific, the processor 110 determines whether a recognition result of the optical character recognition to the binary image matches a correspondingly selected predetermined data of the region of interest. If the recognition result of the optical character recognition to the binary image matches the correspondingly-selected predetermined data of the region of interest, the result of the optical character recognition is correct, otherwise the result of the optical character recognition is incorrect.

If the result of the optical character recognition is incorrect, step S207 is performed again to adjust the configuration value, and the region of interest is converted into the binary image according to the adjusted configuration value.

If the result of the optical character recognition is correct, the processor 110 determines that whether other regions of interest in the image are not yet added to the groups in step S215. If there are other regions of interest in the image that are not yet added to the groups, step S201 is performed again, and that another region of interest is obtained from the image.

If no region of interest in the image that is not added to one of the groups, the processor 110 creates a configuration file corresponding to the image according to the established groups and data of the regions of interest in the groups in step S217.

In step S203, if the region of interest belongs to one of the established groups, the processor 110 adds the region of interest to one of the established groups in step S219. Next, the processor 110 determines that whether there are still other regions of interest in the image that are not yet added to the groups in step S221. If there are still other regions of interest in the image that are not yet added to the groups, step S201 is performed again, and that another region of interest is obtained from the image. If there is no region of interest in the image that is not yet added to one of the groups, the optical character recognition is performed in step S211.

Therefore, the processor 110 may select one region of interest from the image and obtains the data image type of the region of interest, adds the region of interest to one of the established groups or creates a new group for the region of interest, and sets the configuration value of image conversion and the optical character recognition parameters for the newly established group. Not until all the regions of interest in the image are added to the groups does the processor 110 stop repeating the foregoing steps. Next, the processor 110 performs the optical character recognition to each of the groups and adjusts the configuration value of image conversion until the data included in all of the regions of interest in each of the groups is accurately recognized. Finally, the processor 110 creates the configuration file corresponding to the image according to the established groups and the data of the regions of interest in the groups. When a specific region of interest in one of the groups may not be accurately recognized through adjusting the configuration value of image conversion, the processor 110 may remove the region of interest from the group and creates a new group.

FIG. 3A to FIG. 3D are examples of establishing groups for regions of interest according to an embodiment of the invention.

In FIG. 3A, all of number data images of a same data type "Fonts A" (referring to an identical A font) are assigned to a same group. In FIG. 3B, all of the number data images of a same data type "Fonts B" (referring to an identical B font) are assigned to a same group. In FIG. 3C, the data images belong to the data types of the integer, the floating-point number, and the string are respectively assigned to different groups such as an "Integer" group, a "Float" group, and a "String" group. FIG. 3D shows an example in which all of the regions of interest are not grouped. Note that the processor 110 vertically arranges the regions of interest in each of the groups and performs the optical character recognition to the vertically-arranged regions of interest to obtain a greater recognition rate. The regions of interest in the same group may be vertically arranged in a right alignment manner, a center alignment manner, a left alignment manner, or any other alignment manner. Nevertheless, in other embodiments, the regions of interest may not have to be aligned in one of the foregoing manners and may be placed randomly when being arranged in a vertical direction.

To be more specifically, after the processor 110 receives the image from the communication interface 130, the processor 110 groups portions containing the data or all the regions of interest in the image according to the types of the data. The different regions of interest containing different data types are assigned to different groups. For instance, the different regions of interest containing data of different fonts are assigned to different groups. Alternatively, the regions of interest containing different data types such as the integer, the floating-point number, and the string data types are assigned to different groups. After the regions of interest of different data types are assigned to different groups, the processor 110 combines the data images (e.g., the data image containing all of the integer data) of all the regions of interest of each of the groups into a to-be-recognized image. The processor 110 than performs the optical character recognition to the to-be-recognized image of each of the groups to obtain all the data within.

For instance, the to-be-recognized image listed below the "Fonts A" of FIG. 3A is combined by the data images of 17 regions of interest, wherein each of the regions of interest contains data of identical bold typefaces (45, 45, 44, . . . , 150). In the same way, the to-be-recognized image listed below the "Fonts B" of FIG. 3B is combined by the data images of 17 regions of interest, wherein each of the regions of interest contains data of identical thin typefaces (7.0, 7.0, 120, . . . , −1.000). FIG. 3C shows several to-be-recognized images including different data types such as the integer, the floating-point number, and the string data types.

Figure 4:
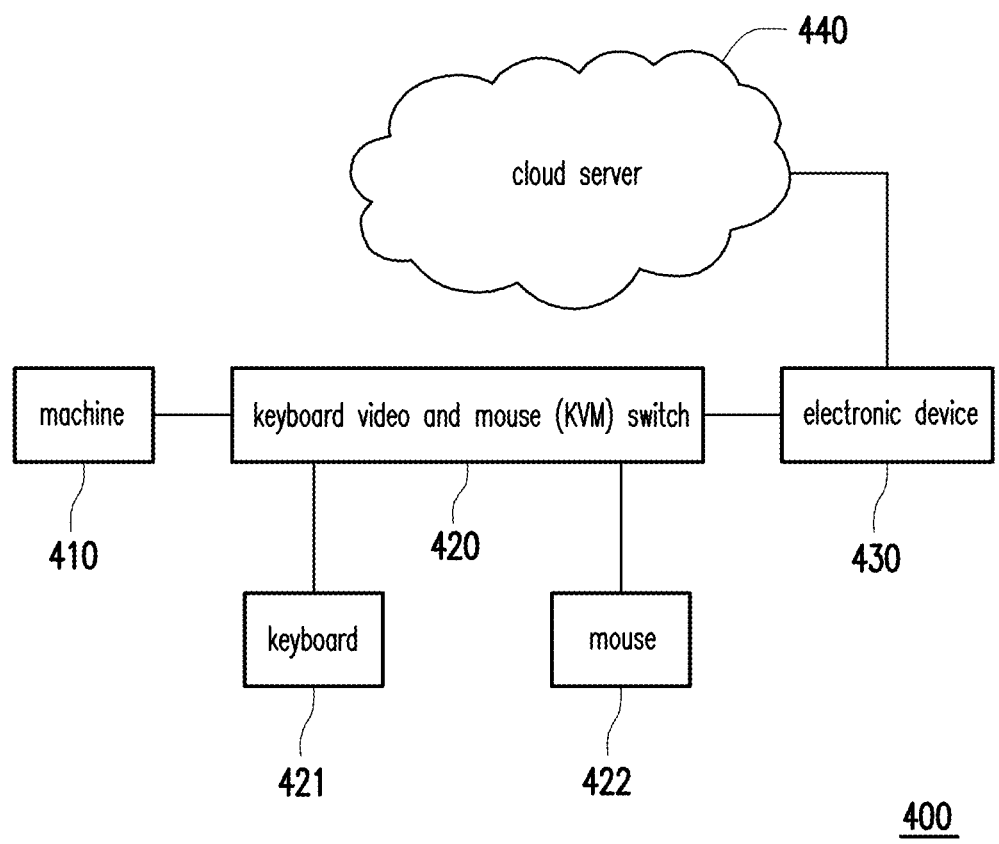
FIG. 4 is a block diagram of an image data retrieving system according to an embodiment of the invention.

FIG. 4 is a block diagram of an image data retrieving system according to an embodiment of the invention.

An image data retrieving system 400 provided by an embodiment of the invention includes a machine 410 a keyboard video and mouse (KVM) switch 420, an electronic device 430, and a cloud server 440. The electronic device 430 and the image data retrieving device 100 of the embodiment of FIG. 1 may adopt a same structure or similar structures. That is, the electronic device 430 may receive data images of the machine 410 through a communication interface of the electronic device 430 from the keyboard video and mouse switch 420. The received data images are then recognized by a processor of the electronic device 430. The keyboard video and mouse switch 420 may be coupled to the electronic device 430 through a wired or wireless network. The keyboard video and mouse switch 420 may be externally connected to a keyboard 421 and a mouse 422 to run the machine 410. Although one electronic device 430 is coupled to one keyboard video and mouse switch 420 and one machine 410 in this embodiment, the invention is not limited thereto. In another embodiment, one electronic device 430 may be coupled to plural keyboard video and mouse switches 420 and may be coupled to each of the machines 410 through each of the keyboard video and mouse switches 420. In another embodiment, one keyboard video and mouse switch 420 may also be coupled to plural machines 410 through a plurality of ports. In another embodiment, plural electronic devices 430 may be coupled to plural keyboard video and mouse switches 420 and plural machines 440, and the electronic devices 430 are coupled to the cloud server 440. In another embodiment, the machine 410 may also be directly coupled to the electronic device 430 through the wired or wireless network without being coupled to the keyboard video and mouse switch 420. Detailed implementations of the image data retrieving system 400 are not limited by the invention.

In this embodiment, the machine 410 may refer to a machine configured to control and/or monitor manufacturing or testing equipment in a factory and may display data related to manufacturing and testing on a display of the machine 410. A plurality of manufacturing or testing data are thereby included in an image outputted by the display of the machine 410. The electronic device 430 may obtain an image identical to the image displayed on the display of the electronic device 430 through the keyboard video and mouse switch 420 from the machine 410. The electronic device 430 may then perform the optical character recognition to the regions of interest of the image to obtain a portion or all of the data in the image and transmits the data obtained to the cloud server 440. In this way, the cloud server 440 may obtain the data of one or more machine 410 and analyze the data.

Figure 5:
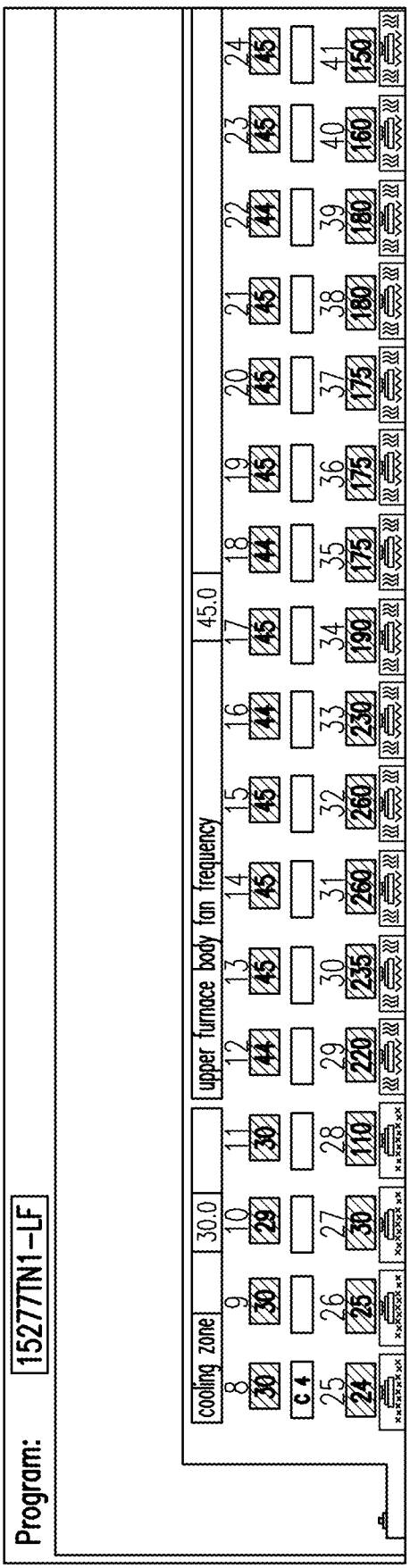
FIG. 5 is a schematic view of a machine image according to an embodiment of the invention.

FIG. 5 is a schematic view of a machine image according to an embodiment of the invention.

With reference to FIG. 5, oblique lines in the image of FIG. 5 are configured to represent the regions of interest with data of the same typeface color and of integers. Therefore, the electronic device 430 assigns all the regions of interest represented by the oblique lines to the same group. One identification (e.g., 8, 9, . . . , 40, 41) is then set for each of the regions of interest, and the optical character recognition is performed after all of the regions of interest are vertically arranged, and that the recognition rate and a recognition speed of the optical character recognition are enhanced and accelerated.

In this embodiment, the regions of interest of the received machine image are grouped and recognized, but the invention does not limit a source of the received image. In another embodiment, the received image may also a picture recorded by an external video camera or by one of a variety of image retrieving devices.

Figure 6:
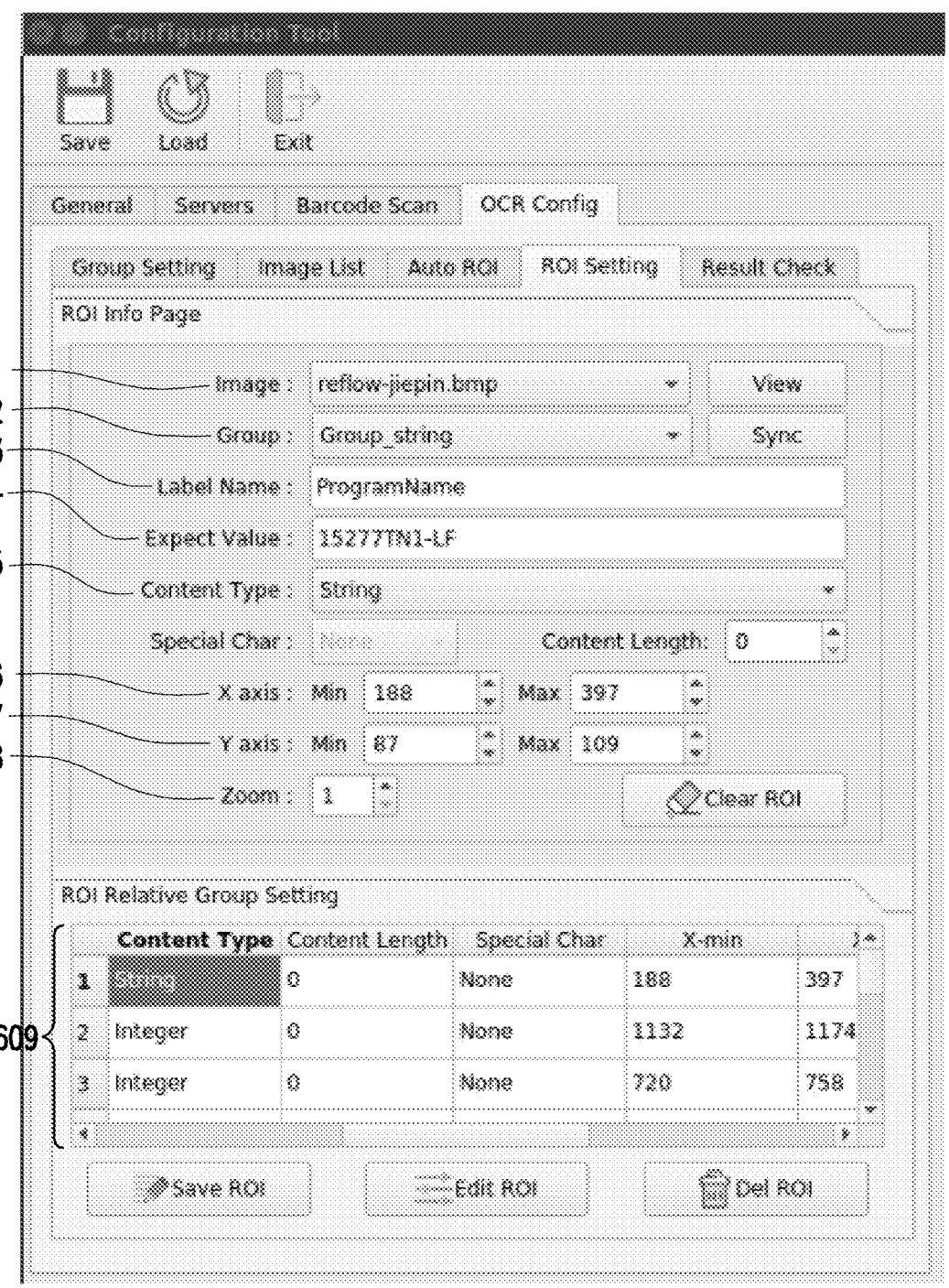
FIG. 6 is a schematic view of a graphic user interface set by a region of interest group according to an embodiment of the invention.
Figure 7:
FIG. 7 is a picture of an instant screenshot of a region of interest according to an embodiment of the invention.
Figure 8:
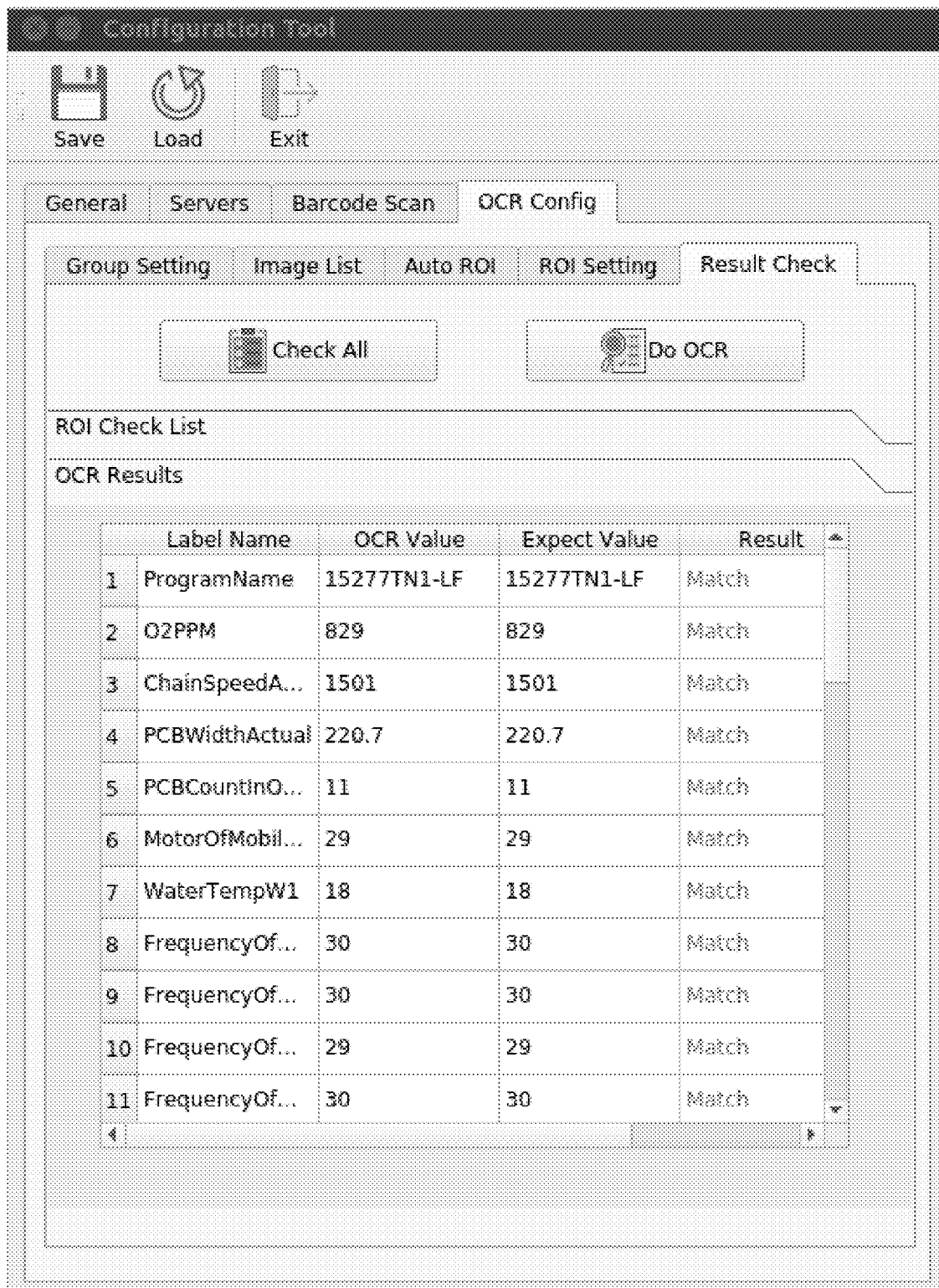
FIG. 8 is a schematic view of a recognition result of a region of interest according to an embodiment of the invention.

FIG. 6 is a schematic view of a graphic user interface set by a region of interest group according to an embodiment of the invention. FIG. 7 is a picture of an instant screenshot of a region of interest according to an embodiment of the invention. FIG. 8 is a schematic view of a recognition result of a region of interest according to an embodiment of the invention.

With reference to FIG. 6, a user may operate a graphic user interface (GUI) on the electronic device 430 to complete setting of the region of interest group. In an embodiment, when the user may select one region of interest through a mouse, an X coordinate range 606 and a Y coordinate range 607 of the selected region of interest may be displayed on the graphic user interface, and simultaneously, a source image file name 601 corresponding to the region of interest is displayed on the graphic user interface as well. The user may select a group 602 for the region of interest and enter a label 603 and a predetermined data 604 for the region of interest. In addition, the user may further select a type 605 and a zoom ratio 608 for the region of interest. Through the setting of the region of interest and the group, the graphic user interface may also show the instant screenshot of the region of interest as shown in FIG. 7. Besides, the graphic user interface may also display a setting 609 of the saved region of interest.

When the user completes all the settings of the region of interest on the machine image, as shown in FIG. 8, the optical character recognition may be performed to the machine image through the graphic user interface, so as to ensure that whether the recognition result of the optical character recognition matches the predetermined data 604. If the recognition results of the optical character recognition to all of the regions of interest on the machine image match the predetermined data 604, the user may thus save information of all of the regions of interest and the groups as one configuration file. Image formats outputted by one machine 410 are identical, and data in the images is displayed on a same location; thereby, the electronic device 430 may quickly retrieves all of the data in the images outputted by the machine 410 through the configuration file. In this embodiment, tens of seconds may be required to perform the optical character recognition to the machine image if the regions of interest are not grouped, and only one second is required when the optical character recognition is performed to the grouped regions of interest through the configuration file. As such, the machine image data may be retrieved instantly, and the retrieved data is transmitted to the cloud server 440.

In view of the foregoing, in the image data retrieving method and the image data retrieving device provided by the embodiments of the invention, the regions of interest in one image are divided into groups. The regions of interest in each of the groups are vertically arranged, and the optical character recognition is then performed to each of the groups, so as to accelerate the recognition speed and enhance the recognition accuracy. When the image is received from the machine, the configuration file corresponding to the regions of interest and the groups may be saved after all the results of the optical character recognition are correct. In this way, when receiving another image on the same machine, the optical character recognition may be directly performed based on the configuration file, and that the recognition speed is accelerated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image data retrieving method, comprising:
receiving an image comprising a plurality of text from a communication interface;
obtaining a plurality of regions of interest from the image, wherein each of the regions of interest is a text image comprising at least one of the text;
dividing the regions of interest into a plurality of text groups of different text types comprising one or more of a font, an integer, a floating-point number and a string, wherein the at least one of the text comprised in the regions of interest of each of the text groups has a same text type;
converting the regions of interest of each of the text groups into binary images and combining the binary images into a to-be-recognized image; and
performing an optical character recognition to the to-be-recognized image corresponding to each of the text groups of the different text types respectively to obtain the text corresponding to the regions of interest of each of the text groups;
wherein the step of dividing the regions of interest into the text groups comprises:
establishing a first group of the text groups according to a first region of interest of the regions of interest;
converting the first region of interest into a first binary image according to a configuration file;
determining whether a sharpness of the first binary image being greater than or equal to a sharpness threshold; and
performing the optical character recognition to the first binary image when the sharpness of the first binary image being greater than or equal to the sharpness threshold.

2. The image data retrieving method as claimed in claim 1, wherein the step of dividing the regions of interest into the text groups further comprises:
adjusting the configuration file and converting the first region of interest into the first binary image according to the adjusted configuration file when the sharpness of the first binary image being less than the sharpness threshold, and determining whether the sharpness of the first binary image being greater than or equal to the sharpness threshold.

3. The image data retrieving method as claimed in claim 1, wherein the step of dividing the regions of interest into the text groups further comprises:
adjusting the configuration file and converting the first region of interest into the first binary image according to the adjusted configuration file when a recognition result of the optical character recognition to the first binary image not matching a predetermined data corresponding to the first region of interest.

4. The image data retrieving method as claimed in claim 1, wherein the step of receiving the image comprises: receiving the image from a display through a keyboard video and mouse (KVM) switch.

5. The image data retrieving method as claimed in claim 1, wherein a configuration file is generated according to the regions of interest and the text groups when the recognized at least one of the text corresponding to each of the regions of interest matches a predetermined data corresponding to each of the regions of interest, and the optical character recognition is performed to another image subsequently received from a display according to the configuration file.

6. The image data retrieving method as claimed in claim 1, further comprising: creating the configuration file according to the regions of interest of each of the text groups and the type of the at least one of the text corresponding to the regions of interest.

7. The image data retrieving method as claimed in claim 1, wherein the step of combining the regions of interest of each of the text groups into the to-be-recognized image comprises: arranging the regions of interest of each of the text groups vertically to combine the regions of interest of each of the text groups into the to-be-recognized image.

8. The image data retrieving method as claimed in claim 7, wherein the regions of interest of each of the text groups are vertically arranged by one of a right alignment manner, a center alignment manner, and a left alignment manner.

9. An image data retrieving device, comprising:
a processor;
a communication interface, coupled to the processor; and
a memory, coupled to the processor and storing a computer program, wherein the processor is configured for executing the computer program to perform following steps:
receiving an image comprising a plurality text from the communication interface;
obtaining a plurality of regions of interest from the image, wherein each of the regions of interest is a text image comprising at least one of the text;
dividing the regions of interest into a plurality of text groups of different text types comprising one or more of a font, an integer, a floating-point number and a string, wherein the at least one of the text comprised in the regions of interest of each of the text groups has a same text type;
converting the regions of interest of each of the text groups into binary images and combining the binary images into a to-be-recognized image;
performing an optical character recognition to the to-be-recognized image corresponding to each of the text groups of the different text types respectively to obtain the text corresponding to the regions of interest of each of the text groups;
wherein the processor is further configured for executing the computer program to perform following steps:
establishing a first group of the text groups according to a first region of interest of the regions of interest,
converting the first region of interest into a first binary image according to a configuration file,
determining whether a sharpness of the first binary image is greater than or equal to a sharpness threshold, and
performing the optical character recognition to the first binary image when the sharpness of the first binary image is greater than or equal to the sharpness threshold.

10. The image data retrieving device as claimed in claim 9, wherein the processor adjusts the configuration file and converts the first region of interest into the first binary image according to the adjusted configuration file when the sharpness of the first binary image is less than the sharpness threshold and determines whether the sharpness of the binary image is greater than or equal to the sharpness threshold.

11. The image data retrieving device as claimed in claim 9, wherein the processor adjusts the configuration file and converts the first region of interest into the first binary image according to the adjusted configuration file when a recognition result of the optical character recognition to the first binary image does not match a predetermined data corresponding to the first region of interest.

12. The image data retrieving device as claimed in claim 9, wherein the communication interface receives the image from a display through a keyboard video and mouse switch and transmits the image to the processor.

13. The image data retrieving device as claimed in claim 9, wherein the processor generates a configuration file according to the regions of interest and the text groups when the recognized at least one of the text corresponding to each of the regions of interest matches a predetermined data corresponding to each of the regions of interest and performs the optical character recognition to another image subsequently received from the display according to the configuration file.

14. The image data retrieving device as claimed in claim 9, wherein the communication interface receives the image from the image retrieving device and transmits the image to the processor.

15. The image data retrieving device as claimed in claim 9, wherein the processor generates the configuration file according to the regions of interest of each of the text groups and the type of the at least one of the text corresponding to the regions of interest.

16. The image data retrieving device as claimed in claim 9, wherein the processor arranges the regions of interest of each of the text groups vertically to combine the regions of interest of each of the text groups into the to-be-recognized image.

17. The image data retrieving device as claimed in claim 16, wherein the regions of interest of each of the text groups are vertically arranged by one of a right alignment manner, a center alignment manner, and a left alignment manner.

* * * * *